(12) United States Patent
Laabs et al.

(10) Patent No.: US 7,858,903 B2
(45) Date of Patent: Dec. 28, 2010

(54) CONSTANT CURRENT WELDING POWER CONTROL SYSTEM AND METHOD

(75) Inventors: Adam P. Laabs, Brillion, WI (US); Daniel C. Fosbinder, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 316 days.

(21) Appl. No.: 11/511,026

(22) Filed: Aug. 28, 2006

(65) Prior Publication Data

US 2008/0047942 A1 Feb. 28, 2008

(51) Int. Cl.
*B23K 9/10* (2006.01)
*B23K 9/06* (2006.01)
*B23K 9/01* (2006.01)

(52) U.S. Cl. ............. 219/130.5; 219/130.4; 219/130.1; 219/137 PS

(58) Field of Classification Search ............ 219/130.01, 219/130.1, 130.5, 130.4, 137 PS
See application file for complete search history.

(56) References Cited

U.S. PATENT DOCUMENTS 3,904,846 A * 9/1975 Risberg ................. 219/130.33
6,040,555 A * 3/2000 Tiller et al. ................. 219/132

* cited by examiner

*Primary Examiner*—Tu B Hoang
*Assistant Examiner*—Ayub Maye
(74) *Attorney, Agent, or Firm*—Fletcher Yoder

(57) ABSTRACT

A technique is disclosed for controlling a constant current regime, such as for stick welding. The regime includes a dig segment or regime in which current is increased as voltage decreases. The dig regime is initiated at a voltage that can be set by an operator. The constant current regime also includes two distinct constant current segments separated by a transition segment. The transition segment occurs at a predetermined voltage, permitting rapid and predictable operation as an arc is lengthened during welding. The constant current segments may be suitable for different types of electrode. The dig selection also permits customizing the regime for soft or stiff digs that are initiated at different voltages (or arc lengths) suitable for different electrode types.

10 Claims, 3 Drawing Sheets

CONSTANT CURRENT WELDING POWER CONTROL SYSTEM AND METHOD

BACKGROUND

The present invention relates generally to welding systems, and particularly to a technique for controlling power applied to a welding arc.

Various techniques are known for welding two or more metal pieces to one another. These techniques typically rely upon application of electrical current through a welding torch, and thereby through an electrode and work piece to heat the work piece and the electrode. In arc welding, an arc is established between the electrode and the work piece, with the arc generating sufficiently high temperatures to melt the work piece, and in certain types of welding the electrode as well. In a type of welding commonly known as "stick" welding, for example, a stick electrode is held in a clamp-like handle and the tip of the electrode is brought into close proximity with a point on a work piece where a weld bead is to be applied. The stick electrode is brought sufficiently close to the work piece to initiate an arc, and may then be drawn back from the work piece to regulate heating of the work piece and of the electrode, and progression of the weld bead. Various types of stick electrodes are known and are currently in use for different types of applications and metals to be welded. These electrodes often have quite different properties, and perform differently in the welding operation.

In typical welding applications, the supply of electrical power to the electrode is regulated, and in many cases may be at least somewhat controlled by the welding operator. Typical controls include constant voltage control and constant current control. Other control schemes may be envisaged, with hybrid schemes being relatively common in the art. Power supplies for stick welding of the type described above are often controlled in a constant current scheme, whereby the current applied to the electrode, and that passes through the arc and work piece, is maintained generally constant over a range of voltages. During the welding operation, an operator typically strikes an arc by touching the electrode tip to the work piece, and then increases the distance between the electrode tip and the work piece during welding. By controlling the distance of the electrode tip from the work piece, the welding operator can regulate the heating of the work piece and the electrode and generally control the weld. To cool the weld, for example, the operator may draw the electrode from the work piece, elongating the arc in a movement commonly referred to as "whipping". Conversely, the operator may press the electrode close to the work piece to penetrate move deeply into its surface in a movement referred to as "digging".

Generally, in a constant current control regime, as the arc length decreases, the voltage applied to maintain the arc also decreases. However, in these operations if the arc becomes sufficiently short, it can be extinguished by the decrease in voltage. To avoid such consequences, conventional constant current power supplies for welding often include a "dig" control which effectively alters the slope of a voltage/current line (increasing the current applied beyond the constant current level) beginning at a pre-determined minimum voltage. Regardless of the dig setting, however, the voltage at which the increase in current begins is identical in such systems. Such control does not take into account differences in the performance of various electrodes. Indeed, while this voltage at which the increase in current begins may work well for certain electrodes, it will typically work much less well for others.

Another feature of conventional constant current controls for welding is a relatively sloppy control of the voltage/current input when the arc becomes longer than a particular length (i.e., above a certain voltage). In general, a welding operator may back the electrode tip significantly off of the work piece, particularly with certain electrodes, to quickly reduce power input. The relatively lax control of the voltage/current waveform, however, makes this operation relatively unpredictable. That is, the operator may not be able accurately to predict how the arc will react as the electrode is drawn farther back from the work piece.

There is a need, therefore, for improved techniques for regulation of constant current welding controls and power supplies. There is a particular need for improved dig control that allows welding operators to adjust system performance to conform to desired operating conditions and particularly to different types of electrodes. There is also a need for an improved constant current control scheme that allows the welding operator to extend the arc significantly and have the constant current control regime react in a predictable and rapid manner, preferably maintaining a constant current regime for a relatively predictable arc length based upon the user input.

BRIEF DESCRIPTION

The present invention provides an improved welding power supply and a power supply control system designed to respond to such needs. The invention allows welding operators to adjust not only the current applied to an arc in a dig region of operation, but the voltage at which the increase in current begins. This increase in voltage may accommodate, for example, performance of different types of electrodes. The invention also provides for adjustment of constant current ranges of power supply based upon the dig control setting. The welding operator may thus extend the arc to reduce power input to the weld quickly and in a predictable manner that is adjusted based upon the operator input. The power supply is suitable for various types of constant current welding control, such as stick welding. However, the technique may be used in conjunction with other types of welding, such as tungsten inert gas (TIG) welding.

In accordance with one aspect of the invention, a method for controlling a welding operation is provided. The method includes receiving a dig input adjustable by a welding operator, and determining a voltage for initiation of a dig regime based upon the dig input, the initiation voltage being adjustable over a range based upon the dig input. Electrical power is then applied at a substantially constant current level over a voltage range during a welding operation. The current is increased in the dig regime based upon the determined voltage.

The invention, then, generally allows an initiation voltage of a dig regime to be adjusted by an operator. The invention also provides welding systems designed to implement the methods offered by the invention.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
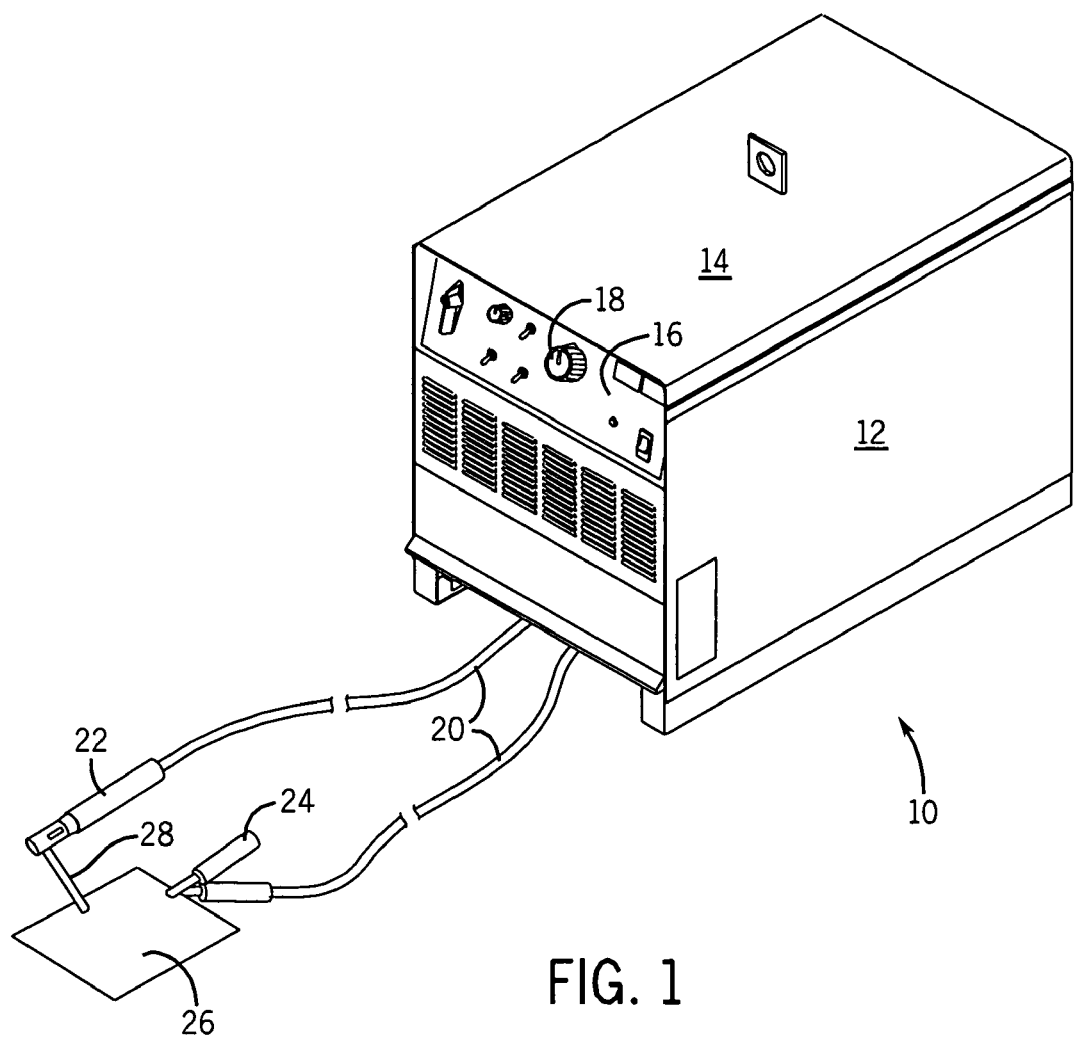
FIG. 1 is a diagrammatical representation of an exemplary welding system utilizing a constant current power supply in accordance with aspects of the invention.

Turning now to the drawings, and referring first to FIG. 1, a welding system is illustrated, and designated generally by reference numeral 10, that includes circuitry for implementing a constant current control regime in accordance with the invention. It should be noted that, as used herein, the term "constant current" means is power provided at a substantially desired current, or a desired current slope, and includes both open and closed loop controls.

The stick welding system 10 illustrated in FIG. 1 includes a power supply 12 based in a cabinet or enclosure 14. As will be apparent to those skilled in the art, the welding system may be configured to permit the power supply to be moved from place to place relatively easily, or may be designed as a generally stationary system. Moreover, the system may be designed for field operation, in which case it may include an engine and generator (not shown) that provide the necessary power, conditioned appropriately for stick welding. Alternatively, the power supply 12 may be designed to receive external power from a power source, such as the power grid.

The power supply cabinet includes a control panel 16 that permits the user to select various welding options, such as the current and polarity of electrical power used for welding, as well as the control of dig as described below. The dig control may be provided via a knob or dial 18 which generates a signal applied to a controller within the system (not shown). The power supply implements the constant current control regime for stick welding as described generally below. It should be noted, however, that the power supply may be designed to allow for other types of welding to be performed in a single unit or power supply. For example, a constant current regime may be implemented for TIG welding, or other regimes, such as constant voltage may be implemented by the power supply for other types of welding, such as MIG welding.

Power provided by the supply is applied to power cables 20. One of the power cables is coupled to a stick electrode handle 22 and the other power cable is coupled to a ground clamp 24. In operation, the ground clamp 24 is secured to a work piece 26. A stick electrode 28 is held in the handle 22. As the welding operator contacts or closely approaches the tip of the stick electrode to the work piece, then, an electrical circuit is completed through the cables, the handle, the electrode, the work piece and ultimately the clamp to generate an arc between the electrode tip and the work piece.

Figure 2:
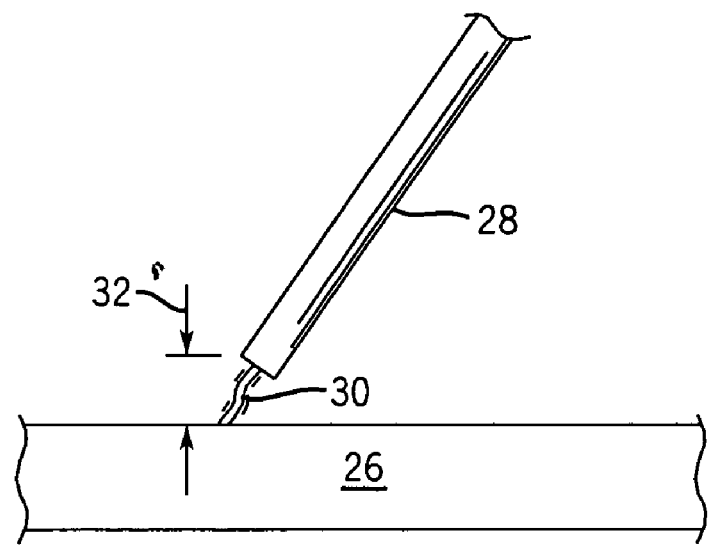
FIG. 2 is a detailed view of an electrode tip approaching a work piece to establish an arc therebetween during initiation of a welding operation.
Figure 3:
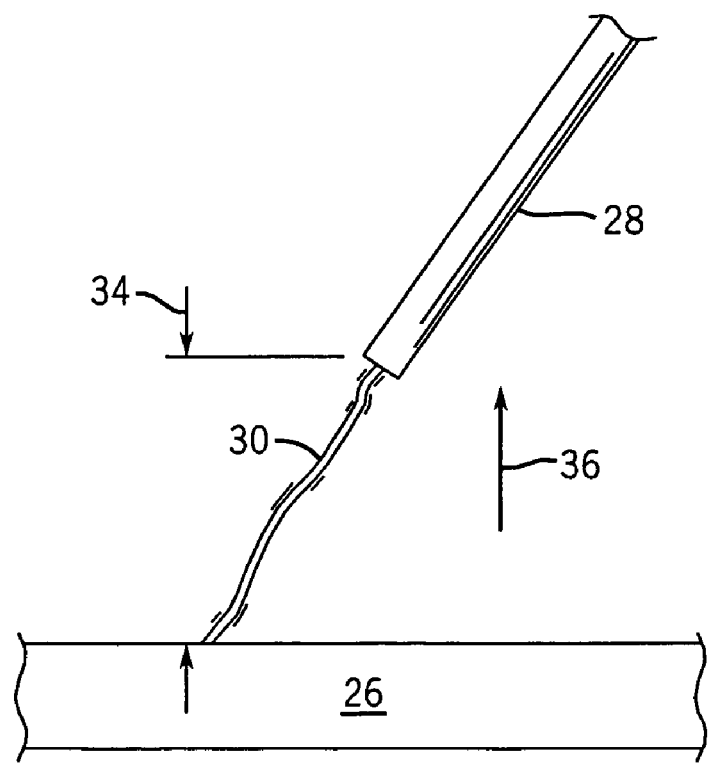
FIG. 3 is a similar detailed view of the electrode tip spaced farther from the work piece and maintaining the arc by regulation of power applied to the electrode in a constant current regime.

The operation of the stick welding components of the system is generally similar to those existing in the art, with the exception of the constant current control regime described below. As will be appreciated by those skilled in the art, and as illustrated in FIGS. 2 and 3, a welding operator will generally regulate such factors as heating, pooling of molten metal, and other aspects of welding by moving the tip of the welding electrode closer or farther from the work piece. As shown in FIG. 2, for example, once an arc 30 is struck between the tip of the electrode 28 and the work piece 26, the welding operator may hold the tip relatively close to the work piece, as indicated by reference numeral 32, so as to cause intense melting of the electrode and of the work piece for fusing of these components, and of the work piece components themselves. Where the operator may wish to cool the electrode, the work piece, or the weld, the electrode tip may be retracted from the work piece a greater distance, as indicated by reference numeral 34 in FIG. 3. This movement of the electrode away from the work piece, as indicated by arrow 36, will generally maintain the arc 30, but will allow for quickly reducing the temperature and power input to the metal. This operation may sometimes be referred to in the art as "whipping." As will be appreciated by those skilled in the art, as the electrode tip is moved a greater distance from the work piece, the voltage required to sustain the arc increases. Conversely, as the electrode tip is moved closer to the work piece, the voltage required to sustain the arc decreases. If the tip becomes very close to the work piece, the arc runs a risk of being extinguished, resulting in the need to increase the energy invested in the arc. This is accomplished by implementing a dig segment in the constant current control as described below. That is, as the arc length decreases, the current input is increased beyond the constant current level applied at higher voltages.

It has been realized, for the present invention, that different stick electrodes may perform substantially differently, and may benefit from different dig regimes. For example, stick electrodes generally referred to by the designation 6010 may require relatively "stiff" dig regimes, while stick electrodes generally referred to by the designation 7018 may benefit from "soft" regimes. In conventional systems, however, little adjustment is available for the agressivity of the dig regime, and any adjustments available generally do not alter the voltage at which the dig regime is initiated. For example, whether the dig is set for soft or stiff, the onset of the dig regime commences at the same voltage, such as 19V.

As described below, in accordance with the present invention, the voltage at which the dig regime is initiated can itself be altered. In a present embodiment, for example, the operator may adjust the dig to soft or stiff, with stiff dig selections being initiated at a higher onset voltage as compared to softer dig settings. Thus, with a 7018 electrode, the welding operator may approach the electrode tip closer to the work piece before the dig regime is initiated. For 6010 electrodes, however, the operator may prefer a stiffer dig regime that begins at a higher voltage for additional input of power to the arc and more penetration into the work piece. As also described below, the present invention provides for adjustment of a foldback or knee region in the constant current regime that may be useful for different types of electrodes.

Figure 4:
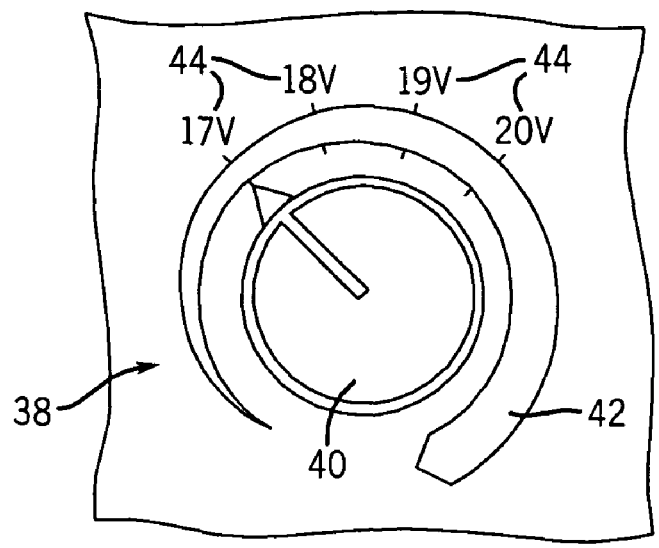
FIG. 4 is an exemplary control input that may be included on a welding power supply in accordance with aspects of the invention for setting the point at which a dig regime begins.

FIG. 4 illustrates an exemplary control interface for adjusting dig in accordance with the present invention. In the interface shown in FIG. 4, and designated generally be reference numeral 38, an adjustment knob or dial 40 allows the operator to input the degree or type of dig desired. The interface will typically be labeled, such as via a graphic 42, and adjustment of the amount of dig will correspond to adjustment of the voltage onset of the dig regime. In the embodiment illustrated in FIG. 4, for example, adjustments may be made between 17 and 20 V, with lower onset voltages corresponding to softer dig settings, and higher onset voltages corresponding to stiffer dig settings. It will be appreciated by those skilled in the art, however, that the actual display may simply be labeled in a convenient and conventional manner, such as with the indicators "soft" and "stiff". Similarly, the exact levels of onset of the dig regime may vary, and the levels of 17, 18, 19 and 20 V are provided here by way of example only. Moreover, the particular dig settings may be detented or discrete, or the system may allow for continuous variations between settings in the permissible dig setting range.

Figure 5:
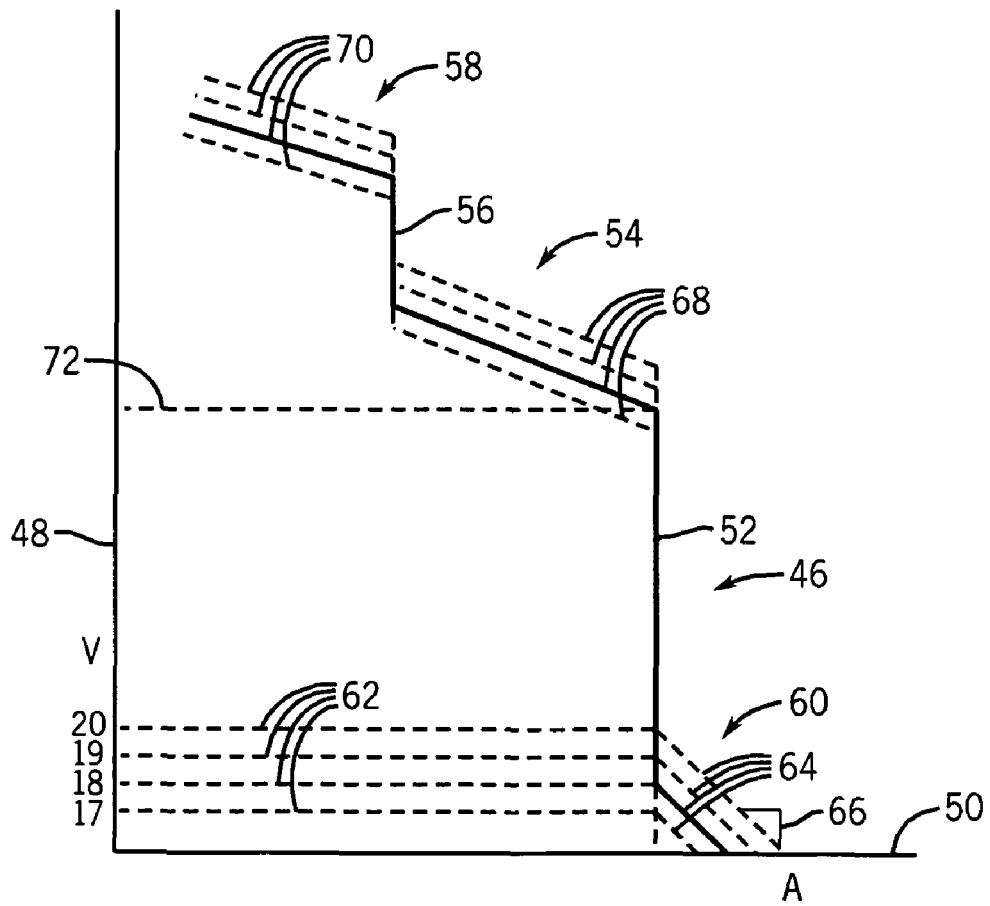
FIG. 5 is a diagrammatical representation of an exemplary constant current control regime for regulating power applied to an electrode in accordance with the present invention, and adjustable by a user.

FIG. 5 is a graphical representation of an exemplary constant current regime in accordance with aspects of the invention. The regime, designated generally by reference numeral 46, is shown as a trace or series of traces relating voltage to current, with voltage being shown along a vertical axis 48, and current shown along a horizontal axis 50. The trace representing the regime includes a first constant current segment 52, above which a knee or transition segment 54 extends. The transition segment 54 is generally well-defined and results in a relatively quick and predictable reduction in amperage for a relatively small increase in voltage. The transition segment 54 terminates in a second constant current segment 56, and ultimately an upper transition segment 58. Below the first constant current segment 52 is a dig segment 60 described in greater detail below. The particular currents and voltages, as well as the points of transition may vary in any particular power supply design, and such parameters can be determined by those skilled in the art without undue experimentation.

As will be appreciated by those skilled in the art, the constant current regime illustrated in FIG. 5 will typically be stored in the memory of the power supply and implemented by the power supply controller. The regime may be stored as a series of equations or as look-up tables or any other format that permits the voltage to be related to the amperage for control of welding. As will be appreciated by those skilled in the art, and as is generally known in the art, for closed-loop control, the power supply will include voltage and current sensors which serve as inputs for control of the voltage and current applied to the electrode. In general, the system will maintain a generally constant current in segments 52 and 56, allowing the operator to move the electrode towards and away from the work piece without significant changes in the current. However, as voltage increases beyond the limits of segments 52 and 56, the controller will implement the sloped transitions indicated by segments 54 and 58, as well as the dig segment 60.

The dig segment 60 actually consists of a family of traces or voltage/current relationships, one of which is illustrated by a solid line in FIG. 5, with others being shown as broken lines. These lines represent alternative segments that are implemented based upon the user-selected setting, typically input via a knob or other input device, as discussed above with reference to FIG. 4. The voltage level at which the dig segment begins is a function of the operator-selected dig setting, as indicated generally by the voltage levels 62 in FIG. 5. Each of the traces 64 in the dig segment 60 of the control regime thus begins at a different voltage, and ends at a different current level along the current axis. In the illustrated embodiment, each of the traces has the same slope as indicated generally by reference numeral 66. However, it should be noted that not only may the onset voltages be different for each of the dig settings, but the slopes of the traces may be different as well. As will be further appreciated by those skilled in the art, because the power input to the arc is generally a product of the voltage and current, for stiffer dig settings, more power will be input into the arc, and such increases will begin at higher voltage levels.

In a present embodiment, the level at which the transition segment 54 begins, and the level at which this segment ends is also a function of the dig setting. It should be noted that a separate control of this segment may also be provided, where desired. Moreover, adjustable dig settings may be provided without altering the transition segment 54, where desired. In the illustrated embodiment, however, a series of traces 68 represent different levels at which the foldback or segment 54 occurs. Similarly, above the second constant current segment 56, a series of current/voltage traces 70 may be defined, also based upon the dig setting, where desired. The transition between the first and second constant current segments will generally be initiated at a particular voltage, as indicated by reference numeral 72. These traces allow for a relatively rapid and predictable voltage level at which the control regime will revert to the second, lower constant current segment 56. In practice, the welding operator may typically operate primarily within one of the constant current segments or the other. It is presently contemplated, for example, that operators may generally prefer to operate within the first constant current segment 52 with 7018 electrodes, and with 6010 electrodes to operate from segment 52 through segment 54 into segment 56, but not typically above segment 56. In either case, the appropriate "feel" of the dig may be adjusted, and the point at which the current transitions to a lower current as the arc is lengthened occurs in a generally predictable and rapid manner.

It should also be noted that, while in the illustrated embodiment the settings shown in the traces of FIG. 5 appear to be discrete, in practice these may be implemented as continuous adjustable settings between the highest dig onset voltage and the lowest onset voltage. Where discrete lines are implemented, these may be more or fewer in number than the four shown. Moreover, in certain embodiments, the point at which each of the dig segment traces intersects the current axis may be substantially different than that shown. That is, the slopes of the dig traces may be different for different dig onset or initiation voltages.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling a welding operation comprising:
   receiving a dig input adjustable by a welding operator;
   determining a voltage for initiation of a dig regime based upon the dig input, the initiation voltage being adjustable over a range based upon the dig input;
   applying electrical power at a substantially constant current level over a voltage range during a welding operation; and
   increasing the current in the dig regime based upon the determined voltage, wherein the current varies substantially linearly with voltage in the dig regime, and a slope of the current to voltage relationship in the dig regime is constant independent of increases and decreases in the initiation voltage.

2. The method of claim 1, further comprising applying electrical power at a second, lower substantially constant current over a second higher voltage range.

3. The method of claim 2, comprising transitioning to the second, lower substantially constant current level at a voltage level determined based upon the dig input.

4. The method of claim 1, wherein the initiation voltage is variable between about 10 volts and about 30 volts.

5. The method of claim 1, comprising applying electrical power at two different substantially constant current levels at different voltage ranges.

6. A welding system comprising:

a power supply for providing electrical current in a constant current regime for welding; and welding cables coupled to the power supply for completing a circuit from the power supply through a work piece via a stick electrode;

wherein the power supply is configured to permit operator selection of a voltage for initiation of a dig regime from a range of voltages, wherein current varies substantially linearly with voltage in the dig regime and a slope of the current to voltage relationship in the dig regime is constant independent of increases and decreases in the initiation voltage, and to initiate the dig regime at the selected voltage.

7. The system of claim 6, wherein the dig regime is part of a constant current regime that includes two substantially constant current segments.

8. The system of claim 7, wherein the two substantially constant current segments are separated by a transition segment occurring at a predetermined voltage.

9. The system of claim 8, wherein the predetermined voltage is adjustable by a welding operator.

10. The system of claim 9, wherein the predetermined voltage is continuously adjustable within a predetermined range.

* * * * *